Jan. 25, 1966     F. A. LUDWIG ETAL     3,231,426
CONTINUOUS CONCENTRATION CELL
Filed Nov. 14, 1960
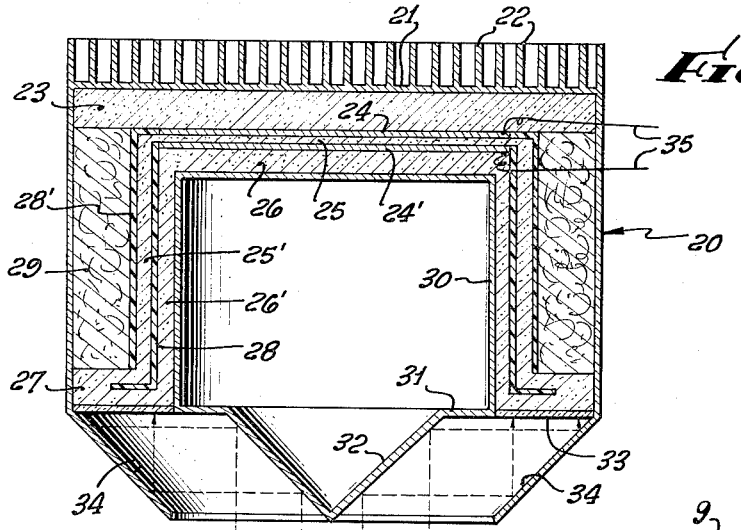
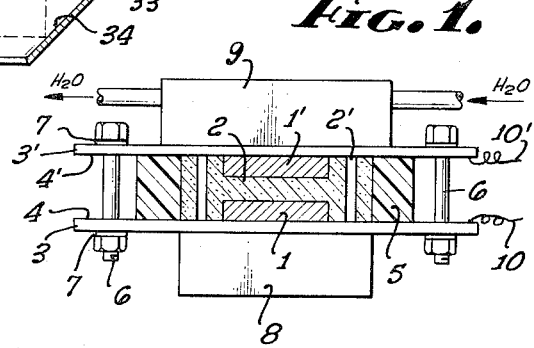
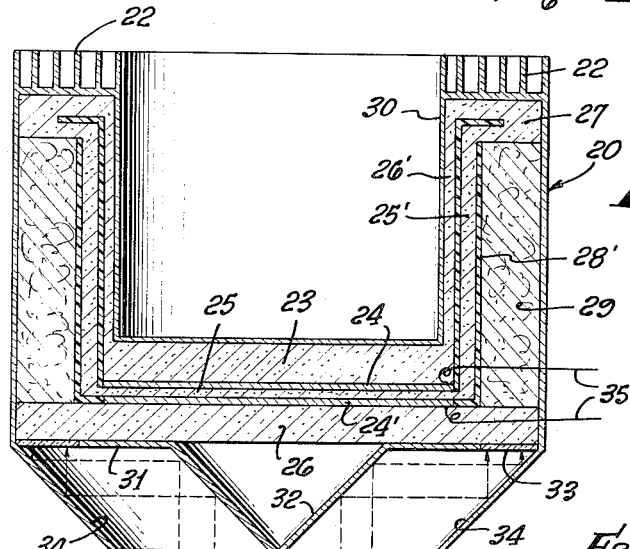
FRANK A. LUDWIG
JOHN J. ROWLETTE
INVENTORS.
BY Miketta and Glenny
ATTORNEYS.

United States Patent Office 3,231,426
Patented Jan. 25, 1966

3,231,426
CONTINUOUS CONCENTRATION CELL
Frank A. Ludwig, Altadena, and John J. Rowlette, Azusa, Calif., assignors to Electro-Optical Systems, Inc., Pasadena, Calif., a corporation of California
Filed Nov. 14, 1960, Ser. No. 68,872
12 Claims. (Cl. 136—4)

In general the present invention concerns method and means for direct conversion of thermal energy including solar energy into electrical energy without mechanical moving parts. More specifically, the present invention converts thermal energy directly into electrical energy by use of a continuous concentration cell with a solute characterized by high activity at high concentrations.

The present commonly used method for converting thermal energy into electrical energy is to use heat to generate steam which drives a turbine and the turbine in turn drives a generator. Such a method necessarily involves heavy, large, expensive, complex equipment which entails constant maintenance, relatively low efficiency and a low power to weight ratio. Because of such shortcomings there has been extensive research and development with respect to methods and means for directly and simply converting thermal energy into electrical energy. One method which has been developed employs a thermocouple in which an electrical potential is set up when the junction between two dissimilar metals is heated. However the maximum efficiency of such thermocouples to date has only been about 6%. Another method which has been developed maintains a temperature difference between two metal electrodes in a vacuum which causes electron flow from the hot electrode to the cold electrode. However the material of construction of said electrodes is quite expensive and the construction of such a vacuum tube is relatively expensive. In addition the high temperature required greatly limits the lifetime of the hot electrode and the maximum efficiency which has been obtained to date has been only about 12%. The present invention provides means and methods for directly converting thermal energy into electrical energy both simply and inexpensively. Moreover the present invention accomplishes such conversion by means which are reliable and long lived without constant maintenance, are capable of high efficiency and are characterized by a high power to weight ratio. In addition, the means of the present invention is simply and cheaply constructed, is light and compact and is adapted for use in vehicles, rockets, satellites, space vehicles, etc.

Generally stated the method of the present invention contemplated the creation and maintenance of a concentration difference between the electrolyte or solute in effective zones adjacent to electrodes by the input of thermal energy from any desired or available source. This is attained in an electro-chemical cell or thermo galvanic converter by the use of an electrolytically conducting solution containing a solute characterized by high activity at high concentration, reversible electrolytic reactivity, stability at high temperatures and ability to be separated from the solution solvent by distillation. The solution is preferably carried by a porous nonconducting bed in operative contact or communication with the electrodes. Such bed also provides means for supplying and permitting the ready flow of electro-chemically reactive gas having reversible electrolytic activity such as a gas containing oxygen between said electrodes. The method contemplates supplying heat to a portion of the solution adjacent what may be termed the hot electrode so as to increase the concentration of solute adjacent such electrode as by distillation of solvent therefrom and in conveying such solvent to the other or cold electrode to maintain a lower concentration of solute adjacent such cold electrode.

The means and method of this invention also contemplate reduction of loss of heat by direct conduction from the hot to the cold electrodes by separation of the fractionator used for distillation from the electrodes whereby the cell is characterized by a high power to weight ratio and high efficiency.

An object of the present invention is to simply and directly convert thermal energy into electrical energy by means of a continuous concentration cell. Another object of the present invention is to convert thermal energy into electrical energy by using a continuous concentration cell with a solute with high activity at high concentrations. Another object of the present invention is to disclose and provide a method of continuously and directly converting thermal energy into electrical energy by generating and maintaining a concentration difference in solute in effective zones adjacent to the electrodes. Another object of the present invention is to convert thermal energy into electrical energy with a light, compact, continuous concentration cell which is reliable, inexpensive, efficient and independent of gravity. Other objects and advantages of this invention will be readily apparent from the following description and drawings which illustrate exemplary embodiments of the present invention.

One of the important features of the present invention is the utilization of thermal energy to set up and maintain a continuous concentration cell; another important feature of the present invention is the effective utilization of the unusual high activity of a solute at high concentrations. The term "activity" as used herein may be defined in the manner suggested by Glasstone in his text book "The Elements Of Physical Chemistry" (1946) on pages 282–287 by the equation: $a=fc$ where "$a$" is the activity of the electrolyte being used, "$c$" is the concentration of the electrolyte being used in moles per liter and "$f$" is the activity coefficient that is the ratio of $a$ to $c$ or the deviation of behavior of the solute from ideal behaviour. In the case of dilute solutions, solutes, in general, approach ideal behavior so that $f$, the activity coefficient, is less than unity but approaches unity. Under the conditions which characterize the method of this invention an activity coefficient materially in excess of unity is utilized to obtain unusual results.

FIG. 1 is a schematic cross section of a circular concentration cell used to obtain the data in Example 1 referred to hereinafter.

FIG. 2 is a schematic cross section of another form of a circular concentration cell in which the method of this invention may be carried out.

FIG. 3 is a schematic cross section of a modification of the circular concentration cell shown in FIG. 2.

The continuous electrochemical cell schematically shown in FIG. 1 comprises two circular electrodes 1 and 1' separated by a porous nonconducting bed or barrier 2 which extends beyond the periphery of the electrodes into contact with cover plates 3 and 3'. The annular extension of bed 2 is provided with a plurality of gas passages or conduits 2' extending between the plates 3 and 3'. The cover plates 3 and 3' are provided with corrosion resistance surfaces 4 and 4', the electrodes 1 and 1' are seated thereon and conducting wires 10 and 10' are connected thereto. An insulating gasket 5 surrounds the bed electrode assembly and the metallic cover plates 3 and 3' are held together as by bolts 6 having insulating washers and sleeves 7. A source of thermal energy is indicated at 8 such as an electrically heated hot plate for heating plate 3. Any convenient source of thermal energy may be used, such as a gas burner, solar heater or the like. Means for removing or dissipating heat from the opposing plate 3' are indicated at 9 such as a container through which cooling water is passed.

The data in Example 1 set forth below was obtained with a cell substantially as is shown in FIG. 1. Plates 3 and 3' were made of nickel, with gold plated surfaces 4 and 4' and insulating gaskets 5 and 7 were made of Teflon. Electrodes 1 and 1' were made of sintered porous platinum and measured 2.2 centimeters in diameter and about 1.5 millimeters thick. Barrier 2 was made of glass filter paper soaked in a 50% by volume solution of sulfuric acid and water and measured about 1 millimeter thick between electrodes 1 and 1' and about 4 millimeters thick between plates 3 and 3'. Oxygen was supplied to electrodes 1 and 1' and barrier 2 by assembling the cell in air and plate 3' was maintained at about 68° C. by the flow of water through container 9.

When heat is applied to plate 3 such as by hot plate 8 water being more volatile than sulfuric acid will move more readily from the heated portion of the cell adjacent plate 3 to the cool portion adjacent plate 3' by fractional distillation. Consequently the sulfuric acid solution adjacent electrode 1' will become more dilute while the sulfuric acid solution adjacent electrode 1 will become more concentrated. However as the heated portion of the cell dries out due to loss of both water and sulfuric acid by distillation, water and sulfuric acid are replaced from the cool portion by capillary action in the porous barrier 2. Ultimately under equilibrium conditions, the loss from the heated portion due to distillation is balanced by the gain due to the capillary action. Yet under equilibrium conditions the concentration of the sulfuric acid adjacent electrode 1 will be greater than the concentration of the sulfuric acid adjacent electrode 1'. Once this concentration difference is set up, electrical energy may be withdrawn from this cell for as long as there is another fluid such as oxygen gas present which will complete the cell reaction cycle. For example, when oxygen is used with sulfuric acid the following reaction cycle is set up between the electrodes:

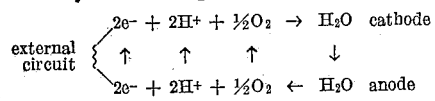

where the cathode is electrode 1 in the high temperature concentrated sulfuric acid portion of the cell and the anode is electrode 1' in the low temperature dilute sulfuric acid portion of the cell. With this specific test cell the data in Example 1 was obtained.

*Example I*

| Temperature hot electrode, ° C. | Resistance (ohms) | Potential (volts) | Current (milliamps) | Power (milliwatts) |
|---|---|---|---|---|
| 274 | *∞ | 0.70 | | |
| 288 | 100 | 0.70 | 7.0 | 4.9 |
| 288 | 10 | 0.50 | 50 | 25 |
| 302 | 2 | 0.12 | 60 | 7.2 |
| 332 | *∞ | 0.80 | | |
| 332 | 10 | 0.18 | 18 | 3.2 |
| 332 | 2 | 0.04 | 20 | 0.8 |

*Symbol denotes infinite resistance i.e. open circuit voltage.

A more sophisticated form of the device is schematically illustrated in FIG. 2 and is adapted for use on a space craft or wherever solar energy is to be used as a source of heat. This form of the cell comprises a cylindrical housing 20 having one end closed by wall 21 which may be provided with heat radiating fins 22. Within the housing and in contact with end wall 21 is a porous nonconducting bed 23. In contact with this bed is a disk-like electrode 24 which is spaced from another disk-like electrode 24' by means of a porous nonconducting barrier bed 25 which has a cylindrical extension 25' terminating in an outwardly extending bed portion 27. The other side of the electrode 24' is in contact with a porous nonconducting bed 26 which has a cylindrical extension 26' also terminating in an outwardly extending bed portion 27. The cylindrical bed extensions 25' and 26' are separated by a nonconducting cylindrical wall 28. The cylindrical bed extension 25' is surrounded and maintained by a nonconducting cylindrical retainer 28' which is spaced from the housing 20 to provide a circular gas chamber or conduit 29 extending between the edge portions of bed 23 and flange bed portion 27. The chamber or conduit 29 may have therein a coarsely porous body of hollow glass fibers, etc., through which gas may readily pass. Various means of supplying thermal energy to bed portion 27 may be used. In the form of the device in FIG. 2, a housing closure member having a cylindrical portion 30 extends into and holds bed portions 26 and 26', has an external portion 31 provided with a conical highly reflective axially located portion 32 and an annular sealing ring portion 33 which is adapted to transmit heat rays and may be made of fused quartz, glass, etc. The housing is also provided with a reflecting ring 34 of frusto-conical form with a highly reflective inner surface for cooperating with cone 32 to direct solar heat rays into bed portion 27 as indicated by the dash line arrows.

It is to be understood that an electrolyte comprising a solvent and solute of the character hereinbefore described and a gas as hereinbefore described are carried by bed 23, barrier 25, its extension 25', bed 26, its extension 26' and bed portion 27. The housing is sealed and suitable electrical conductors 35 are connected to the electrodes and extended from the housing. By applying thermal energy to bed portions 27 when the solvent is more volatile than the solute, solvent is evaporated from such portion and chamber 29 becomes a fractionator with solvent vapors being condensed at the cool annular portion of bed 23 from which heat is being dissipated through end wall 21 and fins 22. A higher concentration of solute is thus established at the hot electrode 24' than at the cold electrode 24 since in effect solvent is removed from bed 26 and its extension 26' to bed portion 27 by capillary action. Capillary forces also cause solvent condensed at the edges of bed 23 to move toward the center of bed 23 and the solute left in bed portion 27 to move to bed 26 through its extension 26'. Finally capillary forces cause the solute produced at electrode 24 and solvent produced at electrode 24' by the cell reactions to move from bed 25 through its extension 25' to bed portion 27. The reactions taking place at the electrodes 24 and 24' in accordance with this method produce a flow of solvent vapors and gas in different and separate zones in a single cell. It is to be noted that the cell is self-contained, does not employ moving parts, and will function in any position and is not influenced by gravitational forces. Another important advantage of this arrangement is that only a very small temperature difference exists between the two electrodes where there is high thermal conductivity due to the small space therebetween while a high temperature difference is maintained between the ends of conduit 29 where there is low thermal conductivity due to the large distance and insulating packing. Consequently heat conduction in the cell is minimized and the cell has a high thermal efficiency. Instead of directing solar energy directly upon bed portion 27 such energy may be directed upon a container of material located adjacent bed portion 27, said material characterized by high heat of fusion, high temperature of solidification and high thermal conductivity such as lithium hydride or a eutectic involving LiH and some other light metal hydride or borohydride. Said container may be carried by sealing ring 33. During periods of time when solar energy is not being received the cell could then effectively operate by drawing heat from said container due to the solidification of said material.

An alternative form of the cell shown in FIG. 2 is shown in FIG. 3 whereby the electrodes are located in the heated portion of the cell rather than in the cooled portion of the cell. It can be readily seen that the construction and operation of the cell shown in FIG. 3 is substantially the same as the cell shown in FIG. 2. The only difference is that in the cell of FIG. 3, the cylindrical extension 26' and its termination in the outwardly extending bed portion 27 are connected to bed 23 rather than bed 26 so that the electrodes are adjacent the hot portion of the cell rather than the cold portion as in FIG. 2.

The conducting electrodes employed in the present invention are preferably finely porous and chemically nonreactive with the electrolyte; finely porous electrodes made on sintered platinum have been found effective. It is desirable to use relatively thin electrodes of large surface area with a minimal thickness nonconducting porous bed or barrier therebetween while maintaining a thickness efficient to minimize the loss of heat by direct conduction from the hot to the cold electrodes. In some instances it may be desirable to use perforated electrodes to facilitate movement of fluids and gases therethrough.

The porous nonconducting bed or barrier may be made of felted asbestos fibers or glass fibers or of ceramic compositions such as alumina, zirconium oxide, etc. Such bed may be provided with channels, passageways or conduits through which solvent and its vapor and gas fluid used in the cell may readily pass. The porosity of such bed is of importance in facilitating the retention of the electrolyte between the electrodes and providing capillary forces which are utilized in carrying solution between and to the electrodes. The porous barrier between the electrodes need not extend beyond the electrodes and may be the only conduit between the electrodes so that movement of solvent by distillation and movement of solution by capillary action will take place countercurrently in the barrier bed. It is preferred that the bed be not completely saturated so as to facilitate the passage of gas between the electrodes but if saturated, it must contain conduits for gas to pass between the electrodes.

Sulfuric, phosphoric and perchloric acids are exemplary of solutes of high activity at high concentrations and sulfuric acid is preferably used because of its very high hydrogen ion activity when concentrated (above about 90% and preferably above about 96%) and its low volatility permitting its use at high temperatures. The solvent used with the solute may be more volatile or less volatile than the solute and may comprise the water or an organic solvent such as an organic amine which can be separated from the solute by distillation without the formation of an undesirable azeotropic mixture.

Any gas or fluid component which has reversible electrolytic activity and is involved in electrode reaction may be employed. When sulfuric acid is the solute either hydrogen, oxygen or sulfur dioxide may be employed, but oxygen is preferred. The use of hydrogen with sulfuric acid however is undesirable due to its oxidation by sulfuric acid at high temperatures.

When a gas conduit is employed such as conduit 29 in FIGS. 2 and 3, it is desirable to place a coarsely porous bed of material therein to reduce heat loss by conduction directly through said conduit from the hot end to the cold end thereof and to provide a fractionating column therein. However the packing should be sufficiently loose to produce spaces too large for any significant capillary forces. A filling or bed of hollow beads, or loosely packed felted glass fibers is effective as thermal insulation but does not impede the flow of vapors through said conduit.

The foregoing description and examples are only illustrative of the present invention and are not limitations on its scope. All alterations and modifications of the present invention coming within the scope of the following claims are considered as part of the present invention.

We claim:

1. A concentration cell wherein thermal energy is converted directly into electrical energy comprising:
   (A) two spaced electrodes;
   (B) a porous non-conducting, barrier intermediate said electrodes and in contact therewith, said barrier:
      (1) containing an electrically conducting solution consisting essentially of a solute and a solvent, said solute having an activity coefficient greater than 1, reversible electrolytic activity, and being separable from said solvent by distillation; and,
      (2) containing open passages to permit transfer of gas between said electrodes;
   (C) a body of gas in said cell contacting said electrodes and permeating said open passages, said gas having reversible electrolytic activity;
   (D) means for delivering heat to the portion of said barrier in contact with one of the spaced electrodes; and,
   (E) means for dissipating heat from that portion of the barrier in contact with the other of the spaced electrodes: whereby upon application of heat to said cell a fractional distillation of the solution occurs, a concentration difference of said solute is set up and maintained between said electrodes, and electrical energy is thereby produced.

2. A cell as stated in claim 1 wherein said solvent is water and said solute is an inorganic acid.

3. A cell as stated in claim 1 wherein said solvent is water, said solute is sulfuric acid and said gas is oxygen.

4. A concentration cell wherein thermal energy is converted directly into electrical energy comprising:
   (A) first and second porous spaced electrodes;
   (B) a porous, non-conducting, barrier intermediate said electrodes and in contact therewith, said barrier:
      (1) containing an electrically conducting solution consisting essentially of a solute and a solvent, said solute having an activity coefficient greater than 1, reversible electrolytic activity, and being separable from said solvent by distillation; and,
      (2) containing open passages to permit transfer of gas between said electrodes;
   (C) a body of gas in said cell contacting said electrodes and permeating said open passages, said gas having reversible electrolytic activity;
   (D) a first porous bed containing said solution contacting said first electrodes and separated from said barrier by such first electrode;
   (E) a second porous bed containing said solution contacting said second electrodes and separated from said barrier by said second electrode;
   (F) means for applying heat to a said first bed;
   (G) means for dissipating heat from said second bed; and,
   (H) a fractionating conduit connecting said beds; whereby upon application of heat to said cell a fractional distillation of the solution occurs, a concentration difference of said solute is set up and maintained between said beds and electrical energy is thereby produced.

5. A cell as stated in claim 4 wherein said solute is sulfuric acid, said solvent is water and said gas is oxygen.

6. A cell as stated in claim 4 wherein said solute is phosphoric acid, said solvent is water and said gas is hydrogen.

7. A cell as stated in claim 4 wherein said means for applying heat includes a body of material characterized by high heat of fusion, high temperature of solidification and high thermal conductivity.

8. A method of converting thermal energy directly into electrical energy in a concentration cell comprising:
   (1) contacting a pair of spaced electrodes separated by a porous, non-conducting, gas passage containing, barrier in said cell with an electrically conducting solution maintained in said barrier, said solution consisting essentially of a solute in a solvent; said solute having an activity coefficient greater than 1, reversible electrolytic activity and being separable from said solvent by distillation, (2) permeating said gas passages and contacting said electrodes with a body of gas having reversible electrolytic activity;

(3) applying heat to the solution in contact with one of the electrodes whereby the solvent is evaporated therefrom; and (4) withdrawing heat from the solution in contact with the other electrode whereby the evaporated solvent is condensed, said evaporation and condensation producing a difference of solute concentration between said electrodes whereby electrical energy is made available from said electrodes.

9. A method according to claim 8 wherein the electrodes are porous and in contact with solution containing, porous, non-conducting beds.

10. A method as stated in claim 8 wherein said evaporation and condensation is done by fractionally distilling said solvent from said solute.

11. A method as stated in claim 8 wherein said solute is sulfuric acid, said solvent is water and said gas is oxygen.

12. A method as stated in claim 8 wherein the evaporation and condensation is conducted in a zone removed from the electrodes and the solution is carried to said electrodes by capillary action.

References Cited by the Examiner

UNITED STATES PATENTS

| | | |
|---|---|---|
| 895,715 | 8/1908 | Basset. |
| 1,847,671 | 3/1932 | Ruben. |
| 2,301,021 | 11/1942 | Dalpayrat. |
| 2,301,022 | 11/1942 | Dalpayrat. |
| 2,310,354 | 2/1943 | Deysher. |

FOREIGN PATENTS 12,172  7/1899  Great Britain.

OTHER REFERENCES

Electrical World, vol. 8, No. 23, page 275.

JOHN H. MACK, *Primary Examiner.*

JOSEPH REBOLD, JOHN R. SPECK, MURRAY TILLMAN, *Examiners.*